United States Patent [19]

Hall

[11] Patent Number: 4,978,447
[45] Date of Patent: Dec. 18, 1990

[54] SELF-PROPELLED APPARATUS FOR CLEANING A WATER TREATMENT TANK

[75] Inventor: Ford W. Hall, Lexington, Ky.

[73] Assignee: Ford W. Hall Company, Lexington, Ky.

[21] Appl. No.: 470,743

[22] Filed: Jan. 26, 1990

[51] Int. Cl.$^5$ .............................................. B01D 21/18
[52] U.S. Cl. .................................... 210/241; 210/530; 210/541; 15/246.5
[58] Field of Search ............... 210/241, 523, 525, 527, 210/528, 530, 541; 15/246.5

[56] References Cited

U.S. PATENT DOCUMENTS

| | | | |
|---|---|---|---|
| 1,356,608 | 10/1920 | Dorr | 210/530 |
| 1,787,437 | 1/1931 | Dutton | 210/530 |
| 1,951,012 | 3/1934 | Finney | 210/530 |
| 1,975,109 | 10/1934 | Laughlin et al. | 210/528 |
| 2,052,676 | 9/1936 | Turk | 210/530 |
| 3,703,016 | 11/1972 | Schramm et al. | 15/246.5 |
| 3,820,231 | 6/1975 | La Clair et al. | 210/530 |
| 3,920,558 | 11/1975 | Lind et al. | 210/241 |
| 3,977,974 | 8/1976 | Peltor | 210/530 |
| 4,046,693 | 9/1977 | Glover | 210/527 |
| 4,190,541 | 2/1980 | Wade et al. | 210/241 |
| 4,830,478 | 5/1989 | Hall | 210/241 |
| 4,876,010 | 10/1989 | Riddle | 210/525 |

FOREIGN PATENT DOCUMENTS 370665 4/1932 United Kingdom .

Primary Examiner—Tom Wyse
Assistant Examiner—Christopher Upton
Attorney, Agent, or Firm—King & Schickli

[57] ABSTRACT

An apparatus for cleaning algae and debris from a water treatment tank includes a carriage that is mounted for movement while extending over a clean water flow channel of the treatment tank. A motor drives the carriage around the tank while a guide maintains the carriage in the proper position for cleaning. A series of brush assemblies are connected to a frame of the carriage. The brushes of these assemblies are adapted to engage and clean the weir, baffle, spillway and clear water flow channel of the tank as the carriage moves. Additionally, a directional controller automatically controls the direction of operation of the motor and hence the direction of movement of the carriage. The directional controller also includes a sensor adapted to sense any obstructions, such as a service walkway, extending across the movement path of the carriage. Upon sensing an obstruction, the direction of movement of the carriage is reversed.

12 Claims, 2 Drawing Sheets

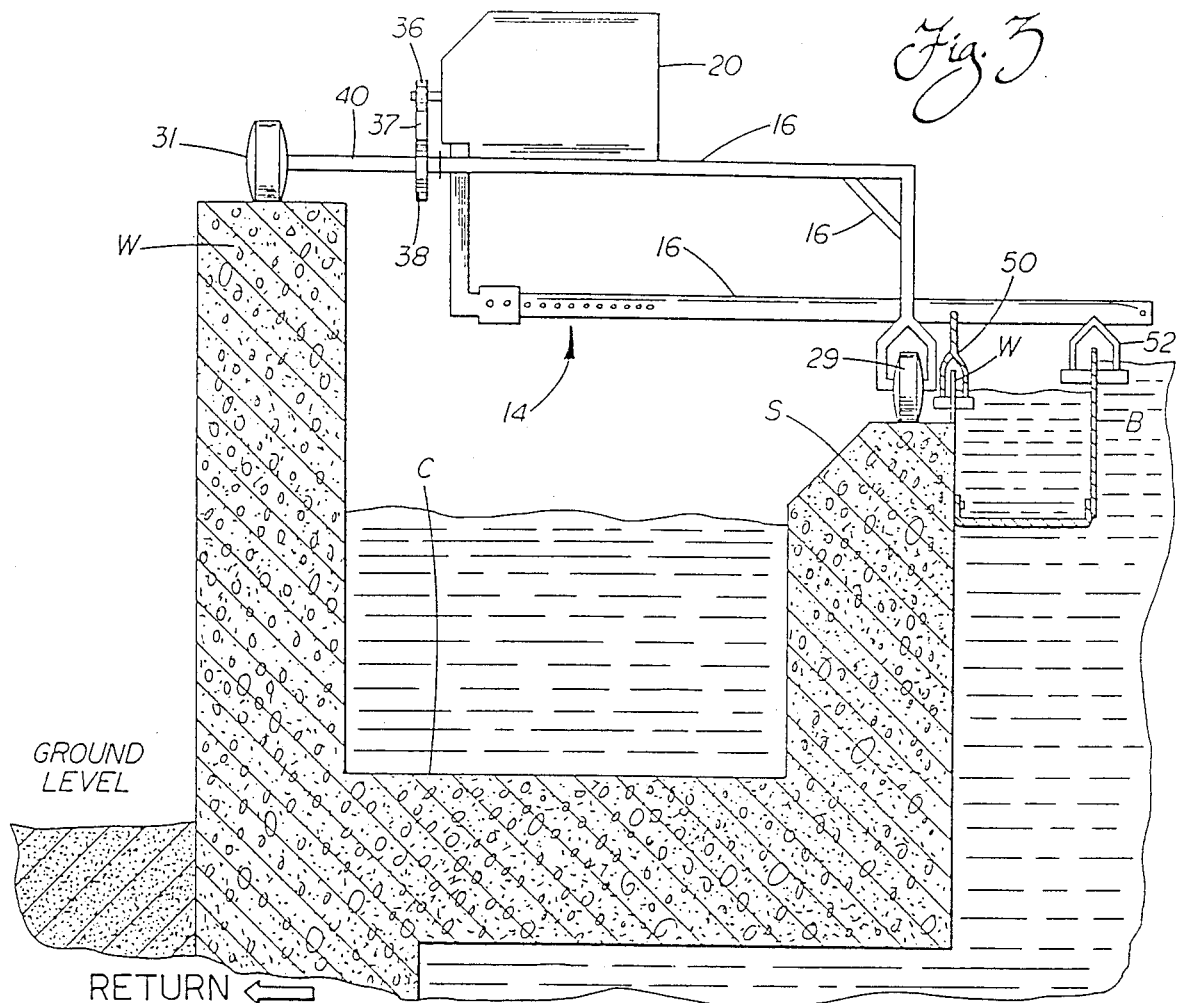
Fig. 3
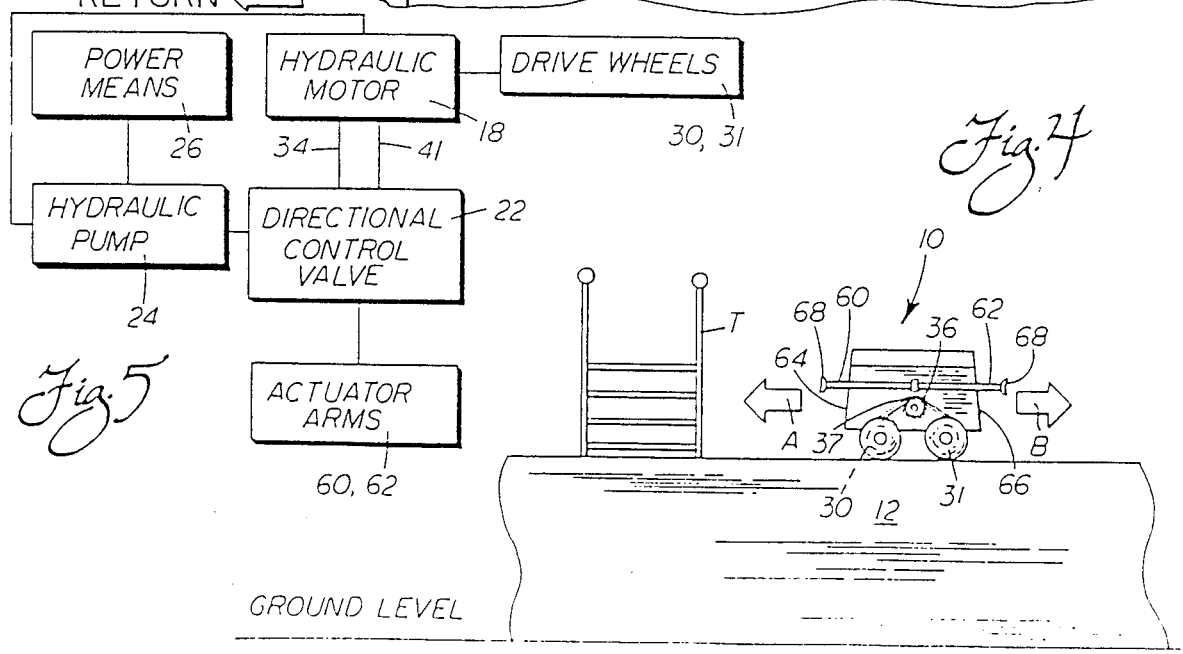
Fig. 5
Fig. 4

SELF-PROPELLED APPARATUS FOR CLEANING A WATER TREATMENT TANK

TECHNICAL FIELD

The present invention relates generally to the cleaning of sewage treatment facilities and more particularly, to a self-propelled apparatus for automatically removing algae and debris from the surfaces of a final sedimentation water treatment tank.

BACKGROUND OF THE INVENTION

The necessity for providing sewage treatment plants to clean and purify water discharged from homes and factories is well known. The function of a sewage treatment facility is to receive raw sewage (water containing waste material) as discharged from a city sewage system and clean it to ultimately produce purified water. This is accomplished through a series of biological and mechanical processes.

In a typical water treatment facility, the raw sewage is received from the sewage system and passed through a coarse screen to remove large pieces of matter. The sewage is next directed to one or more primary sedimentation tanks or clarifiers. The sewage remains in primary sedimentation for a period of time sufficient to allow the majority of the heavy matter to settle to the bottom of the tank forming sludge. This sludge is removed for "digestion" by microorganisms. The digested sludge is then dried and can be used as compost or fertilizer. The remaining liquid is treated in a second biological system to remove ammonia. The liquid from this treatment is then aerated and passed into final sedimentation water treatment tanks to remove any remaining solid material.

Water treatment tank configurations vary with each treatment facility application. This notwithstanding, most final sedimentation water treatment tanks are circular. This simplifies automatic skimming, churning and/or bottom scraping operations. More specifically, by eliminating inaccessible corners and providing uniform surfaces, a revolving scraper arm or skimmer blade can provide complete and efficient churning and prevent sludge buildup.

During operation of one type of water treatment tank, water containing sediment enters the center of the tank. In a continuous process, the lighter clean water is effectively decanted from the heavier sediment containing water. More particularly, the clean water is displaced from the tank by the constant flow of water containing sediment into the tank. The displaced clean water is forced to flow under a baffle plate for collecting floating scum and then over a weir, ultimately entering a clean water flow channel. The clean water flow channel directs the water to the next treatment stage where it is chlorinated and further made safe to be discharged into a river or stream.

As is known in the art, the outdoor exposure of the water treatment tanks to direct sunlight encourages the growth of algae. This growth is most prevalent on the baffle, weir, spillway and clean water flow channel. Disadvantageously, algae growth on these members inhibits the flow of clean water from the tank. Further, the algae can be carried in thick masses and high concentrations in the clean water being discharged from the final treatment tank. When this occurs, large concentrations of chlorine are required to kill the algae. Because chlorine is relatively expensive, it is desirable to avoid this problem.

For many years, the removing of algae from the baffle, weir, spillway and clean water flow channel was completed primarily by scrubbing the tank structure with brushes manipulated by hand. Because the final treatment tanks are quite large, this naturally, is a labor-intensive and tedious process, involving a large expenditure of man-hours and cost outlay. Additionally, the algae removing process must be done frequently, thereby further adding to the cost.

Recognizing a need to automate the cleaning process, the present inventor previously patented an apparatus for cleaning algae and debris from a water treatment tank in U.S. Pat. 4,830,748. While this apparatus is particularly effective in cleaning the baffle, weir, spillway and clean water flow channel of a circular tank, it is somewhat limited in application in that it is adapted to be mounted to a revolving skimmer blade. Accordingly, it can only be effectively utilized with water treatment tanks incorporating such a blade. In view of this, a need is identified for a self-propelled cleaning apparatus for utilization with other types of water treatment tanks.

SUMMARY OF THE INVENTION

It is therefore an object of the present invention to provide an apparatus for effectively cleaning algae and other debris from the baffle, weir, spillway and clean water flow channel of a water treatment tank.

Another object of the present invention is to provide an apparatus for cleaning algae and debris from a water treatment tank that is relatively inexpensive to construct, simple to install and economical to operate.

Still another object of the present invention is to provide an algae cleaning apparatus that is self-propelled and, accordingly, may be effectively utilized even on water treatment tanks not including a revolving skimmer blade.

Yet another object of the present invention is to provide an apparatus for cleaning algae and debris from a water treatment tank which automatically reverses its direction of movement upon sensing an obstruction, such as a service walkway, extending across its path of movement around the water treatment tank.

Additional objects, advantages and other novel features of the invention will be set forth in part in the description that follows and in part will become apparent to those skilled in the art upon examination of the following or may be learned from the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a self-propelled apparatus is provided for cleaning algae and other debris from a circular water treatment tank.

The preferred embodiment of the cleaning apparatus selected to illustrate the invention comprises a carriage including a frame. A motor connected to the carriage is provided for driving the carriage in a path of movement about the treatment tank. Means are also provided for guiding the carriage as it is driven. Cleaning means, in the form of brushes, are connected to the frame of the carriage and adapted to engage and clean the treatment tank. More specifically, a total of three brush assemblies are utilized. The first brush assembly cleans the baffle and the inside surface of the weir. The second brush assembly cleans the spillway and the third brush assembly cleans the clean water flow channel.

The apparatus also includes a directional control system that automatically controls the direction of operation of the motor and thereby the direction of movement of the carriage around the treatment tank. The directional control system includes a means, such as a pair of opposing outwardly extending arms, for sensing an obstruction in the path of movement of the carriage as it travels around the water treatment tank. Thus, the apparatus senses any obstruction such as a service walkway across the path of movement of the apparatus and reverses its direction of operation before any damaging contact can take place. In this way the apparatus may be left unattended to thoroughly clean and scrub algae and debris from the baffle, weir, spillway and clean water flow channel of a water treatment tank. Accordingly, the cost of labor is significantly reduced.

The apparatus may be guided in any appropriate manner as it moves in a path of movement about the tank. For example, the carriage may include wheels that engage a track that is connected to the water treatment tank. As another example, the apparatus may include one or more pinch roller guides that engage each side of the weir and/or baffle.

Preferably, the drive motor is a hydraulic motor connected in a hydraulic circuit including a pump and a power source, such as an electric motor, diesel motor or gasoline motor. In such a system, the directional control means comprises a directional control valve assembly. The pair of outwardly extending arms of the directional control means actuate the valve. One of the arms extends beyond the front or forward face of the carriage while the other arm extends beyond the rear face of the carriage. Each arm includes a means on its distal end for engaging an obstruction. For example, the engaging means could be a resilient bumper. Accordingly, when an arm engages an obstruction, the valve assembly is actuated to redirect the flow of hydraulic fluid in the circuit. This causes the carriage drive motor to reverse its direction of operation and the carriage to similarly reverse its direction of movement away from the detected obstruction.

Still other objects of the present invention may become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects without departing from the invention. Accordingly, the drawing and description will be regarded as illustrative in nature and not as restrictive.

BRIEF DESCRIPTION OF THE DRAWING

The accompanying drawing incorporated in and forming a part of this specification, illustrates several aspects of the present invention, and together with the description serves to explain the principles of the invention. In the drawing.

Figure 2:
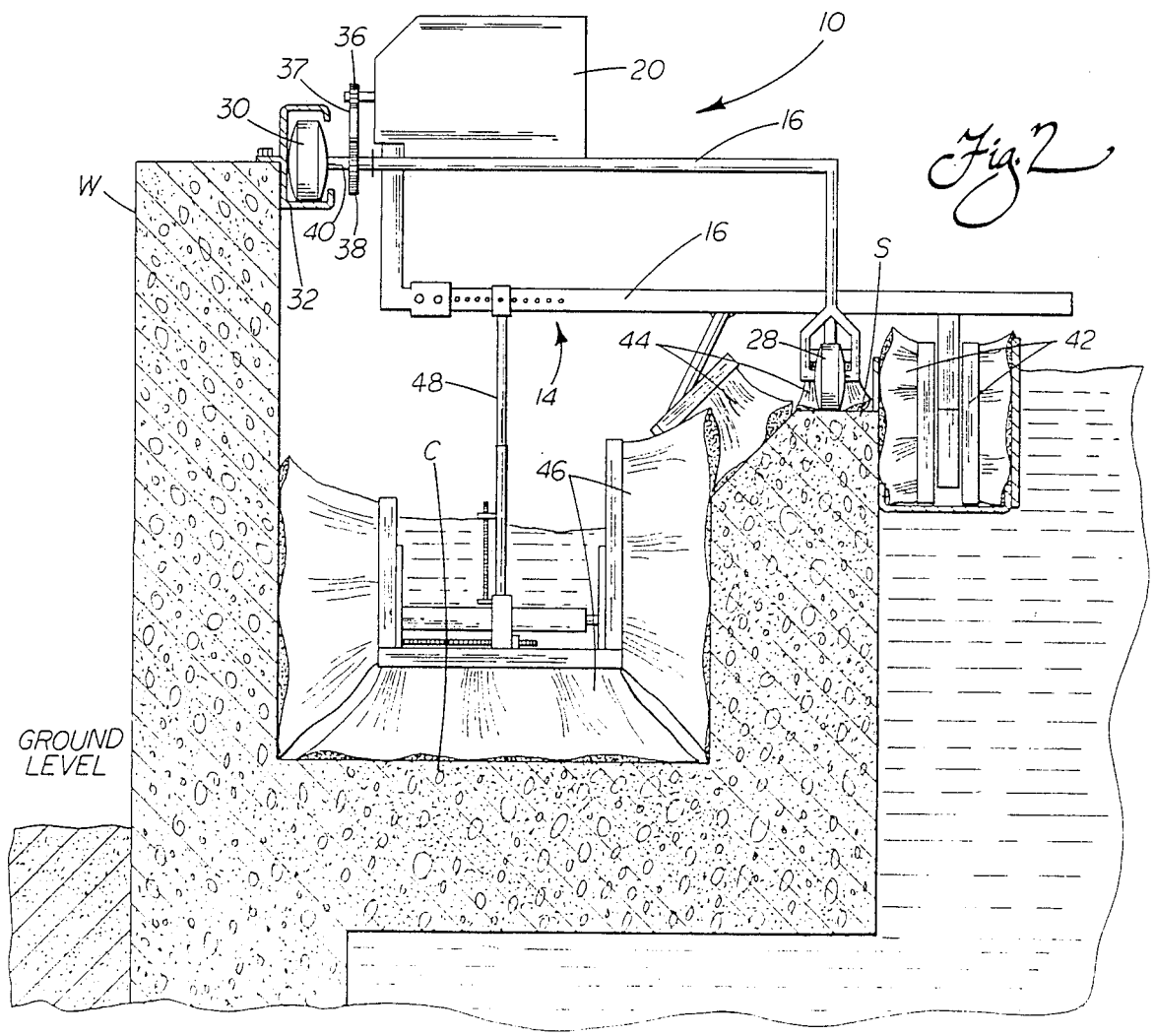

The brush assemblies have been removed to clearly show the carriage and drive wheel structure;

FIG. 2 is a cutaway sectional view of the apparatus of the present invention traveling along a track about a treatment tank;

FIG. 3 is a cutaway sectional view similar to FIG. 2 but showing a second embodiment of the invention wherein pinch rollers are utilized to guide the carriage about the water treatment tank (note: brush assemblies removed for clarity);

FIG. 4 is a schematical view showing the cleaning apparatus of the present invention traveling along the upper surface of the clean water flow channel toward a surface walkway; and FIG. 5 is a schematical drive circuit for the apparatus of the present invention.

Reference will now be made in detail to the present preferred embodiment of the invention, an example of which is illustrated in the accompanying drawing.

DETAILED DESCRIPTION OF THE INVENTION

Figure 1:
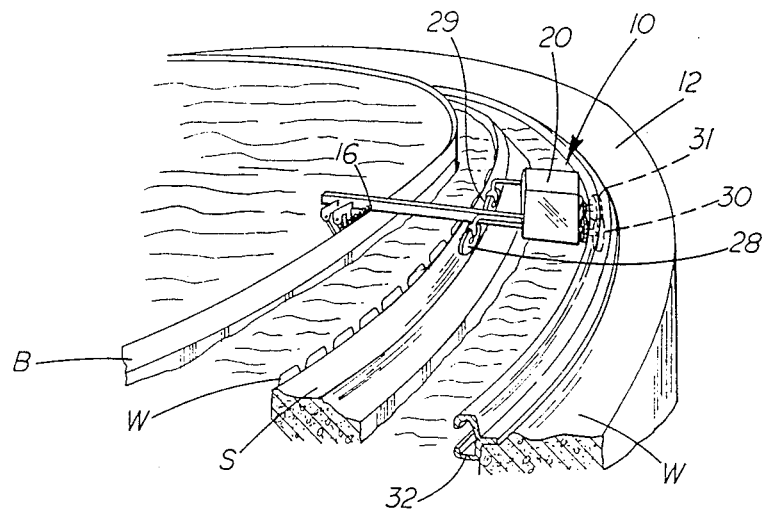
FIG. 1 is a perspective view of the cleaning apparatus of the present invention shown installed in a water treatment tank.

Reference is now made to FIG. 1 showing the apparatus 10 of the present invention installed in a final sedimentation water treatment tank 12. As is shown in FIG. 1 and 2, the apparatus 10 includes a carriage 14 formed from frame members 16. A hydraulic drive motor 18 is mounted in a housing 20 on the carriage 14. As best shown in FIG. 5, the hydraulic drive motor 18 is connected in a hydraulic circuit including a directional control valve assembly 22 and a hydraulic pump 24 operatively driven by a power means 26 such as an electric, diesel or gasoline motor. It should be appreciated that the directional control valve assembly 22, hydraulic pump 24 and power means 26 are also all mounted to the carriage 14 and may, in fact, be mounted within the housing 20.

As shown in FIGS. 1 and 2, the carriage 14 is supported for movement about the water treatment tank by means of a series of four wheels, 28, 29, 30 and 31. Two of the wheels 28, 29 are adapted to engage and ride upon the upper surface of the spillway S. The other two wheels 30, 31 are adapted to engage between and follow upper and lower guide rails or tracks 32 which are mounted to the inner periphery of the outer wall W of the clean water flow channel C. The tracks 32 extend around the entire periphery of the water treatment tank 12 so as to guide the carriage 14 and maintain it in proper position over the clean water flow channel C as it moves along a path of movement around the tank 12.

More particularly, the power means 26 drives the hydraulic pump 24. Hydraulic fluid from the pump 24 is then directed to the directional control valve assembly 22. When in a first position, the directional control valve assembly 22 directs the hydraulic fluid through a first line 34 to the hydraulic motor 18, thereby driving the motor and drive sprocket 36 (through a load adaptor such as a Helland Model 200) in a first direction. The drive sprocket 36 is operatively connected through a drive belt or chain 37 to driven sprockets 38 which are fixed to the axles 40 supporting the drive wheels 30, 31. In this manner, the carriage 14 is driven in a forward direction about the water treatment tank 12.

It should also be appreciated, however, that the carriage may be driven in a rearward direction by placing the directional control valve assembly 22 in a second position so that the hydraulic fluid from the pump is fed through the line 41. This causes the hydraulic motor 18 to operate in the opposite direction thereby driving the drive wheels in a reverse direction through the sprockets 36, 38. Further explanation of the selection of the particular drive direction will be discussed in greater detail below.

In the preferred embodiment of the apparatus 10 of the present invention, three brush assemblies are provided for cleaning the water treatment tank as the carriage 14 is driven around the tank. The brush assemblies, which are similar to the brush assemblies disclosed in U.S. Pat. No. 4,830,748, are shown in FIG. 2. The first brush assembly 42 is adapted for cleaning the baffle B and an inside surface of the weir W. As best shown in FIG. 2, the brush assembly 42 is pivotally mounted to the frame 16 of the carriage 14 and spring biased to ensure the best cleaning engagement.

A second brush assembly 44 is specifically adapted for cleaning the spillway S. As shown, the brush assembly 44 is extended directly downwardly from the frame 16 of the carriage 14 and is adjusted so as to provide the desired frictional engagement for the best cleaning action without undue drag being placed on the drive motor 18.

The third brush assembly 46 is especially adapted for cleaning the clean water flow channel. This assembly comprises a series of brushes formed together in a substantially U-shape that are specifically adapted to engage and clean the walls of the clean water flow channel C. As shown, the brushes 47 are supported from the frame 16 of the carriage 14 by means of a telescoping support arm 48 that is resiliently biased to an extended position. Advantageously, this telescoping assembly allows the carriage assembly 14 to pass over the center of the brush assembly 46 when the carriage 14 changes direction of travel as will be described in greater detail below.

A second embodiment of the apparatus 10 of the present invention is shown in FIG. 3. In FIG. 3, the brush assemblies are not shown for purposes of simplicity and to clarify the understanding of the structure of this embodiment. It should be appreciated, however, that the brush assemblies 42, 44, 46 would be mounted to the frame 16 of the carriage 14 of this embodiment in the same manner shown in FIG. 2.

As shown in FIG. 3, the drive wheels 30, 31 of the carriage 14 engage the upper surface of the outer wall W of the clean water flow channel C. Preferably, the drive wheels are constructed of soft rubber for excellent traction. The guide rails or tracks 32 have been eliminated in this embodiment in favor of pinch rollers. As shown, a pinch roller assembly 50 may be provided for engagement with the weir W. Additionally, or in the alternative, a second pinch roller assembly 52 may be provided for engagement with the baffle B. By engagement of the pinch roller assembly 50 with the weir W and/or engagement of the pinch roller assembly 52 with the baffle B, the carriage 14 is effectively guided around the periphery of the tank 12 while maintaining its proper position over the clean water flow channel C. Of course, it should also be appreciated that the third brush assembly in engagement with the clean water flow channel also effectively serves to maintain the carriage 14 in its proper position throughout its movement cycle.

Whether the first or second embodiment of the apparatus 10 of the present invention is utilized, it should be appreciated that the apparatus 10 is provided with a directional control mechanism best demonstrated by reference to FIGS. 4 and 5. As best shown in FIG. 4, the directional control valve assembly 22 is actuated through a pair of opposed, outwardly extending actuator arms 60, 62. The first arm 60 extends outwardly beyond the front face 64 of the carriage 14 and the housing 20. The second arm 62 extends outwardly beyond the rear face 66 of the carriage 14 and housing 20. Further, it should be appreciated that the end of each arm 60, 62 includes a resilient bumper 68 specifically adapted to engage any obstruction such as a service walkway T extending across the path of the apparatus 10 as it moves about the treatment tank 12.

The operation of the directional control system of the apparatus 10 of the present invention will now be described in detail with reference to FIG. 4. More particularly, as the apparatus 10 moves in the direction of action arrow A, the resilient bumper 68 on the actuator arm 60 will engage the service walkway T. Immediately upon engagement, the actuator arm actuates the directional control valve assembly 22 (note FIG. 5) to redirect hydraulic fluid from the pump 24 from the line 34 to the line 41. This serves to reverse the operation of the hydraulic motor 18 and, thus, the directional drive of the drive wheels 30, 31. Accordingly, the apparatus 10 is immediately driven in the reverse direction as represented by action arrow B away from the service walkway T. This reversal of direction is accomplished prior to the engagement of the housing 20 and carriage 14 with the walkway T so as to prevent any possibility of damage to either the walkway T or the apparatus 10.

As the apparatus 10 reverses its direction of travel, the telescoping arm 48 of the third brush assembly 46 is retracted until the apparatus 10 crosses over the center of the assembly, thereby flipping the brush assembly into a trailing position where it is again drug behind the carriage 14 for cleaning the clean water flow channel C.

It should be appreciated that the apparatus 10 continues to travel in the reverse direction until it again engages an obstruction across its path of movement. In a typical water treatment tank 12, this would mean that the opposite actuator arm 62 would engage the opposite side of the service walkway T shown in FIG. 4 through the resilient bumper 68. When this occurs, the directional control valve assembly 22 is actuated and the hydraulic fluid from the pump 24 is then redirected back through the line 34 to the hydraulic motor 18. When this happens, the drive wheels 30, 31 are then immediately driven in the forward direction and the direction of the movement of the apparatus 10 is reversed to the forward direction again away from the service walkway T. The carriage 14 again travels over the center of the third brush assembly 46 which flips to a trailing position for cleaning the clean water flow channel C as the apparatus 10 moves back toward the position shown in FIG. 4. This cycle continues indefinitely without the need for supervision for as long as it is desired for the apparatus to operate to clean the algae and debris from the treatment tank 12.

In summary, numerous benefits are achieved by the use of the apparatus of the present invention. More specifically, the apparatus 10 is adapted to be utilized to clean algae and debris from water treatment tanks in an effective and efficient manner at significant cost savings to the operator. Once the brush assemblies 42, 44 and 46 are installed on the frame 16 of the carriage 14 and placed into engagement with the baffle, weir, spillway and clean water flow channel, the apparatus may be started to clean the tank 12 automatically. Since the apparatus 10 is relatively lightweight and, accordingly, fairly convenient to move from one tank to another, the apparatus can be used to clean a number of tanks at a treatment facility. This also results in significant savings in time and labor expended.

The foregoing description of a preferred embodiment has been presented for purposes of illustration and description. It is not intended to be exhaustive or to limit the invention to the precise form disclosed. Obvious modifications or variations are possible in light of the above teachings. For example, the brush heads can be replaced by high pressure water jets to provide the cleaning action. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

I claim:

1. An apparatus for cleaning algae and other debris from a circular water treatment tank including a central influent, a service walkway, a peripheral baffle having inside and outside surfaces, a substantially circular weir, a substantially circular spillway and a clean water flow channel, comprising:

carriage means;

means mounted on said carriage:

means for driving said carriage means in a path of movement about the periphery of said treatment tank;

means for guiding said carriage means as it is driven;

cleaning means connected to said carriage means and adapted to engage and clean said baffle, weir, spillway and/or flow channel; and directional control means for automatically controlling the direction of operation of said drive means and thereby the direction of movement of said carriage means around said treatment tank, said directional control means including means for sensing an obstruction in the path of movement of said carriage means.

2. The apparatus as set forth in claim 1, wherein said guide means is a track connected to said water treatment tank and said carriage means includes means for engaging said track.

3. The apparatus as set forth in claim 1, wherein said guide means includes means, connected to said carriage member, for engaging said circular weir of said water treatment tank.

4. The apparatus as set forth in claim 3, wherein said engaging means is a pinch roller.

5. The apparatus as set forth in claim 1, wherein said guide means includes means, connected to said carriage means, for engaging said baffle of said water treatment tank.

6. The apparatus as set forth in claim 5, wherein said engaging means is a pinch roller.

7. The apparatus as set forth in claim 1, wherein said cleaning means includes a brush assembly for cleaning said baffle and an inside surface of said weir.

8. The apparatus as set forth in claim 1, wherein said cleaning means includes a brush assembly for cleaning said spillway.

9. The apparatus as set forth in claim 1, wherein said cleaning means includes a brush assembly for cleaning said clean water flow channel.

10. The apparatus as set forth in claim 1, wherein said drive means includes a hydraulic motor connected in a hydraulic circuit including a pump means and power source and said directional control means comprises a directional control valve assembly.

11. The apparatus as set forth in claim 1, wherein said obstruction sensing means includes an actuator connected to said directional control means, said actuator including a pair of outwardly extending arms, one arm extending beyond a forward face of said carriage means and another arm extending beyond a rearward face of said carriage means, each arm including a means for engaging an obstruction, engagement of an obstruction causing said actuator to activate said directional control means to reverse the direction of operation of said drive means.

12. The apparatus as set forth in claim 11, wherein said obstruction engaging means is a resilient bumper.

* * * * *